3,169,060
PHOTOCONDUCTIVE LAYERS FOR ELECTRO-
PHOTOGRAPHIC PURPOSES
Helmut Hoegl, Wiesbaden, Germany, assignor, by mesne assignments, to Azoplate Corporation, Murray Hill, N.J.
No Drawing. Filed June 17, 1960, Ser. No. 36,748
Claims priority, application Germany July 3, 1959
15 Claims. (Cl. 96—1)

As photoconductive layers for electrophotographic purposes inorganic substances, such as selenium and zinc oxide as well as several organic low molecular weight compounds, such as anthracene, chrysene or benzidine have already been used.

Now, photoconductive layers, particularly for electrophotographic purposes, have been found which are characterized in that they consist, at least partially, of at least one polymerization product or copolymerizate of aromatic hydrocarbons, having in a fused ring a double bond, and/or substitution products thereof.

Photoconductive substances according to the present invention are polymerizates and copolymerizates of aromatic compounds which, in a fused ring, have a double bond and may be substituted. Such compounds are 1.2-dehydro-ace-compounds, e.g., 1.2-dehydro-acephenanthrene and 1.2-dehydro-aceanthrene, particularly 1.2-dehydro-acenaphthene (acenaphthylene), and also indene. Suitable electron-releasing substituents for these compounds are in particular substituents such as those stated on page 604, Table I, of "Organic Chemistry" (second edition), by L. F. and M. Fieser, e.g., alkyl groups, such as methyl, ethyl, propyl, butyl, isobutyl, and amyl; alkoxy groups, such as methoxy, ethoxy, propoxy, and butoxy; dialkylamino groups, such as dimethyl amino, diethyl amino, dipropyl amino, and dibutyl amino; hydroxyl groups esterified with carboxylic acids, such as acetic acid, propionic acid, and butyric acid; free hydroxyl groups and amino groups.

Suitable copolymerizates are those compounds according to the present invention with each other and in particular those with other mononuclear or polynuclear aromatic vinyl compounds, e.g., mononuclear aromatic vinyl compounds such as styrene and methyl styrene; vinyl naphthalenes, such as 1-vinyl naphthalene, and 2-vinyl naphthalene; vinyl anthracenes, such as 1-vinyl anthracene, and 9-vinyl anthracene; vinyl diphenyls, such as 4-vinyl diphenyl, and 3-vinyl diphenyl; vinyl fluorenes, such as 2-vinyl fluorene; vinyl acenaphthenes, such as 5-vinyl acenaphthene; vinyl phenanthrenes, such as 2-vinyl phenanthrene, and 3-vinyl phenanthrene; vinyl pyrenes, such as 3-vinyl pyrene; vinyl naphthacenes, such as 9-vinyl naphthacene; vinyl perylenes, such as 3-vinyl perylene; 6-methoxy-2-vinyl naphthalene, 1-methoxy-2-vinyl naphthalene, 4-methoxy-1-vinyl naphthalene, and 6-methoxy-1-vinylnaphthalene; 9-vinyl-10-methyl-anthracene, 9-vinyl-10-ethyl-anthracene; and 6-acetoxy-2-vinyl naphthalene.

Furthermore, there may be used copolymerizates with heterocycles having a ring with a polymerizable double bond at an aromatic nucleus, such as coumarone.

The polymerizates and copolymerizates of the compounds according to the present invention may be prepared by thermal means and by known polymerization processes, e.g., block, dispersion or suspension polymerization, using known radical-forming compounds, such as peroxides or azo compounds or ion-forming compounds, such as boron-fluoride or its etherates, as catalysts. If block polymerization is effected, the monomer is advantageously melted, and the radical-forming substance is then added. After completion of the polymerization, the product obtained is advantageously purified by dissolving it in a solvent and reprecipitating it from the solution. The process can also be performed in the presence of an inert solvent, in which case the polymerizate generally precipitates. The precipitate is separated by filtration, washed with a solvent, if necessary, and dried. The polymerizate thus obtained may be further purified by reprecipitation.

According to the methods stated above, there are obtained polymerization products approximately corresponding to the following general formula:

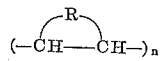

wherein R is a mononuclear or polynuclear fused aromatic radical, which may be substituted, and $n$ is an integer greater than 1.

Depending on the reaction conditions, such as the temperature, the solvent and the kind and quantity of the catalyst used, polymerizates of different degrees of polymerization are obtained. Relatively high molecular weight compounds of this kind are, in general, resin-like and may be applied as photoconductive layers to base materials without the addition of a binder.

The monomeric aromatic hydrocarbons having a fused ring with a double bond, which are subjected to polymerization according to the present invention can be prepared in known manner, if they are not commercially available. If the highly polymeric reaction products described above are to be used as photoconductive layers for electrophotographic purposes, they are applied, advantageously after being dissolved in an organic solvent, to a base material, e.g., by casting, coating or spraying the solution and then evaporating the solvent. The products can also be applied to the support in the form of aqueous dispersions or dispersions in an organic solvent. The base materials used as supports may be any that satisfy the requirements of electrophotography, e.g., metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g., by chemical treatment or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$.cm.$^{-1}$, preferably higher than $10^{-10}$ ohm$^{-1}$.cm.$^{-1}$.

The base material provided, as described above, with a thin coherent layer of uniform thickness of the photoconductive substance according to the present invention is used for electrophotographically producing copies by uniformly charging the photoconductive layer in the absence of light, e.g., with a corona discharge taken from a charging device maintained at about 6000 to 7000 volts. Subsequently, the electrophotographic material is exposed to light in contact with a master or by episcopic or diascopic projection of a master; an electrostatic image corresponding to the master used in thus obtained. This invisible image is developed by contacting it with a developer consisting of a carrier and a toner, suitable carriers being tiny glass balls, iron powder, or tiny plastic balls. The toner consists of a resin-carbon black mixture or of a colored resin. The toner used usually has a grain size of about 1–100μ, preferably 5–30μ.

The developer may also consist of a resin or pigment suspended in a dielectric liquid, in which, if desired, resins are dissolved. In the case of dry development, the developed image is fixed e.g., by heating it with an infrared radiator to a temperature of 100–170° C., preferably 120–150° C., or by treatment with solvents, such as trichloroethylene, carbon tetrachloride, and ethyl alcohol or steam. Images are thus obtained which are high in contrast. These electrophotographic images may be transformed into printing plates, and for this purpose, they are wiped over with a suitable solvent, or with a developing liquid, preferably an alkaline-aqueous developer, rinsed with water and inked with greasy ink. Printing plates are thus obtained which may be clamped into an offset printing machine and used for printing.

If transparent base materials are used, the electrophotographic images can also be used as masters for the production of additional copies on any type of layer. When using translucent supports for the photoconductive layers according to the present invention, reflex images can also be produced.

The photoconductive layers of the present invention absorb light, mainly within the ultraviolet range of the spectrum. The sensitivity of the photoconductive layers can be improved by the addition of activating substances such as, e.g., organic compounds which in molecular complexes of the donor-acceptor type (π-complexes, charge transfer complexes) can serve as electron acceptors. They are compounds of a high electron affinity and are acids according to the definition of Lewis. Compounds of such nature are those containing strongly polarizing residues or groups, respectively, such as the cyano group or nitro group; halides, such as fluorine, chlorine, bromine or iodine; the ketone group, the ester group, the acid anhydride group or acid group, suchas the carboxylic group, or the quinone configuration. Such strongly polarizing electron attracting groups are described by L. F. and M. Fieser in "Organic Chemistry," second edition, 1950, page 604, Table I. Owing to the low vapor pressure thereof, such compounds are preferred, the melting point of which is above room temperature, i.e., solid substances which are difficulty vaporized. Moderately colored compounds, such as quinone can be used, however, it is preferred to use colorless or only slightly colored compounds. The maximum of absorption of the compounds should preferably be within the ultraviolet range of the spectrum, i.e., below 4500 A. Moreover, the activator compounds to be used according to the present invention should be of low molecular weight, i.e., the molecular weight thereof should range between about 50 and about 5000, preferably between about 100 and about 1000 since, with the low molecular weight activators, reproducible results, with respect to sensitivity, can be obtained. Moreover, the sensitivity is maintained constant over a long period as, in contradistinction to the high molecular weight compounds, the low molecular weight compounds do not change appreciably when stored.

Such compounds are, e.g.:

| | |
|---|---|
| 2-bromo-5-nitro-benzoic acid. | o-Chloronitro-benzene. |
| 2bromo-benzoic acid. | Chloro-acetophenone. |
| 2-chloro-toluene-4-sulphonic acid. | 2-chloro-cinnamic acid. |
| Chloro-maleic acid anhydride. | 2-chloro-4-nitro-1-benzoic acid. |
| 9-chloroacridine. | 2-chloro-5-nitro-1-benzoic acid. |
| 3-chloro-6-nitro-1-aniline. | 3-chloro-6-nitro-1-benzoic acid. |
| 5-chloro-nitrobenzene-5-sulfo chloride. | Phthalic acid anhydride. |
| 4-chloro-3-nitro-1-benzoic acid. | Chloro-mucoic acid. |
| 4-chloro-2-hydroxy-benzoic acid. | Bromo-mucoic acid. |
| 4-chloro-1-phenol-3-sulfonic acid. | Styrene-dibromide. |
| 2-chloro-3-nitro-1-toluene-5-sulfonic acid. | Xylene tetra-bromide. |
| 4-chloro-3-nitro-benzenephosphonic acid. | β,β,β-Trichlorolactonitrile. |
| Dibromo-succinic acid. | Triphenyl-chloro-methane. |
| 2,4-dichlorobenzoic acid. | Tetrachloro-phthalic acid. |
| Dibromo-maleic acid anhydride. | Tetrabromo-phthalic acid. |
| 9,10-dibromo anthracene. | Tetraiodophthalic acid. |
| 1,5-dichloro-naphthalene. | Tetrachloro-phthalic acid anhydride. |
| 1,8-dichloro-naphthalene. | Tetrabromo-phthalic acid anhydride. |
| 2,4-dinitro-1-chloro naphthalene. | Tetraiodo-phthalic acid anhydride. |
| 3,4-dichloro-nitrobenzene. | Tetrachloro-phthalic acid monoethyl-ester. |
| 2,4-dichloro-benzisatin. | Tetrabromo-phthalic acid monoethylester. |
| 2,6-dichloro-benz-aldehyde. | Tetraiodo-phthalic acid monoethylester. |
| Hexabromo-naphthalic acid anhydride. | Iodoform. |
| bz-1-cyano-benzanthrone. | Fumaric acid dinitrile. |
| Cyanoacetic acid. | Tetracyanoethylene. |
| 2-cyano-cinnamic acid. | 1,3,5-tricyanobenzene. |
| 1,5-dicyano-naphthalene. | |
| 3,5-dinitro-benzoic acid. | 2,4-dinitro-1-chloro-naphthalene. |
| 3,5-dinitrosalicylic acid. | 1,4-dinitro-naphthalene. |
| 2,4-dinitro-1-benzoic acid. | 1,5-dinitro-naphthalene. |
| 2,4-dinitro-1-toluene-6-sulfonic acid. | 1,8-dinitro-naphthalene. |
| 2,6-dinitro-1-phenol-4-sulfonic acid. | 2-nitrobenzoic acid. |
| 1,3-dinitro-benzene. | 3-nitro-benzoic acid. |
| 4,4'-dinitro-diphenyl. | 4-nitro-benzoic acid. |
| 3-nitro-4-methoxy-benzoic acid. | 3-nitro-4-ethoxy-benzoic acid. |
| 4-nitro-1-methyl-benzoic acid. | 3-nitro-2-cresol-5-sulfonic acid. |
| 6-nitro-4-methyl-1-phenol-2-sulfonic acid. | 5-nitro-barbituric acid. |
| 3-nitro-2-hydroxy-1-benzoic acid. | 4-nitro-benzaldehyde. |
| 2-nitro-1-phenol-4-sulfonic acid. | 4-nitro-phenol. |
| 4-nitro-1-phenol-2-sulfonic acid. | Picric acid. |
| 3-nitro-N-butyl-carbazole. | Picryl-chloride. |
| 4-nitro-diphenyl. | 2,4,7-trinitrofluorenone. |
| Tetranitro-fluorenone. | 1,3,5-trinitro-benzene. |
| 2,4,6-trinitro anisol. | |
| Anthraquinone. | 1-chloro-2-methyl-anthra-quinone. |
| Anthraquinone-2-carboxylic acid. | Duroquinone. |
| Anthraquinone-2-aldehyde. | 2,6-dichloro-quinone. |
| Anthraquinone-2-sulfonic acid anilide. | 1,5-diphenoxy-anthraquinone. |
| Anthraquinone-2,7-disulfonic acid. | 2,7-dinitro-anthraquinone. |
| Anthraquinone-2,7-disulfonic acid-bis-anilide. | 1,5-dichloro-anthraquinone. |
| Anthraquinone-2-sulfonic acid dimethylamide. | 1,4-dimethyl-anthraquinone. |
| Acenaphthene-quinone. | 2,5-dichloro-benzoquinone. |
| Anthraquinone-2-sulfonic acid methylamide. | 2,3-dichloro-naphthoquinone-1,4. |
| Acenaphthene-quinone-dichloride. | 1,5-dichloro-anthraquinone. |
| Benzoquinone-1,4. | 1-methyl-4-chloro-anthraquinone. |
| 1,2-benzanthraquinone. | 2-methylanthraquinone. |
| Bromanil. | Naphthoquinone-1,2. |
| 2-nitro-benzene-sulphinic acid. | 4-nitro-acenaphthene. |
| 1-chloro-4-nitroanthraquinone. | Naphthoquinone-1,4. |
| Chloranil. | Pentacene-quinone. |
| 1-chloro-anthraquinone. | Tetracene-7,12-quinone. |
| chrysene-quinone. | 1,4-tolu-quinone. |
| Thymo-quinone. | 2,5,7,10-tetrachloro-pyrene, quinone. |

The quantity of activator which is advantageously added to the photoconductors can be easily determined by simple experiments. It varies according to the compound used and usually amounts from about 0.1 to about 100 moles, preferably from about 1 to about 50 moles based on 1000 moles of photoconductive substance. Mixtures of several activator substances can also be used. In addition to these compounds, dyestuff sensitizers may also be added.

By the addition of the activating compounds, photoconductive layers can also be produced which are highly light-sensitive, especially within the ultraviolet range; they are practically colorless. By means of these compounds, it is possible to strongly activate the photoconductive layers within the ultraviolet range, whereupon a high sensitivity of the photoconductive layers within the range of visible light can be obtained by a very small addition of optical sensitizers, without so much of the dyestuff sensitizers being used as to result in highly colored layers.

However, the sensitivity of the layers can be extended into the longer wave range of the spectrum by means of strongly complex-forming activators which cause an intensification of the colors, which is similar to that obtained by dyestuff sensitizers.

Even very small quantities, e.g., less than 0.01 percent of dyestuff sensitizers capable of extending the sensitivity of the layers from the ultraviolet into the visible range of the spectrum are effective. In general, however, quantities of from 0.01 to 5 percent, preferably from 0.05 to 3 percent, of the dyestuff sensitizers are added. Additions of larger quantities are possible, but no increase of the sensitivity will, in general, be achieved. If the dyestuff sensitizers are used without the addition of activators, it will be advisable to use quantities approaching the upper limits stated above. In the presence of activators, very small quantities of dyestuff sensitizers are effective.

The following compounds may be listed as examples of dyestuff sensitizers which can be used with good or excellent effect. They are taken from the "Farbstofftabellen," by Schultz 7th edition, 1931, vol. 1:

Triarylmethane dyestuffs such as Brillant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B No. 863, p. 364) and Fast Acid Eosin G. No. 870, p. 368), as also phthaleins such as Eosin S (No. 883, p. 375), Eosin A (No. 881, p. 374), Erythrosin (No. 886, p. 376), Phloxin (No. 890, p. 378), Bengal Rose (No. 889, p 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); cyanine dyestuffs, e.g., Cyanine (No. 921, p. 394) and chlorophyll.

The photoconductive layers described above may be used in reproduction processes as well as in measuring techniques for recording purposes, e.g., photographic recorders. They are, however, also suitable for the production of other devices containing photoconductors, such as photoelectric cells, photoelectric resistors, and television receiver tubes. The photoconductive layers according to the present invention may be used in admixture with other photoconductors, with pigments, such as zinc oxide, or titanium dioxide, or if desired with resins such as ketone resins. It is, however, one of the advantages thereof that, being high molecular weight practically colorless substances, they can be applied to the supports in the form of homogeneous transparent layers and they require no additional binding agent, or other substance to be excellent photoconductive layers. If paper is used as a base material, coating is possible without an excessive penetration of the coating solution.

The invention will be further illustrated by reference to the following specific examples.

*Example I*

A solution of 7.6 parts by weight of polyacenaphthylene in 75 parts by volume of toluene is coated onto paper by means of a coating device and dried. The layer thus formed is provided with a negative electric charge in the absence of light by means of a corona discharge of 6000 to 7000 volts, exposed to light through a transparent master, and subsequently is dusted with a developer, in known manner. The image of the master thus obtained is fixed by heating. The developer used is obtained by mixing tiny glass balls and a very finely divided resin/carbon black mixture. The glass balls used as a carrier are of a grain size of about 100 to 400µ, while the grain size of the resin/carbon black mixture used as the toner amounts to about 20 to 50µ. The developer comprises 100 parts by weight of tiny glass balls and 63 parts by weight of the toner, which had been prepared by melting together 30 parts by weight of polystyrene (Polystyrol LG), 30 parts by weight of a modified maleic acid resin ("Beckacite" K105) and 3 parts by weight of carbon black ("Peerless Black" Russ 552) and then cooling, grinding and sieving the melt. The following table shows several additions and the time of exposure obtained under the given conditions. Sections B and C of the table relate to Examples 2 and 3 below.

A. POLYACENAPHTHYLENE

| Parts by weight of polymerizate | Parts by weight of additive | Additives | Light Source of distance of 30 cm. | Time of exposure (in sec.) |
|---|---|---|---|---|
| 1 | 2 | 3 | 4 | 5 |
| 7.6 | ------ | ------ | High pressure mercury lamp of 125 watts. | 15 |
| 7.6 | 0.123 | Chloranil | ---do--- | 3 |
| 7.6 | 0.168 | Dibromoanthracene | ---do--- | 2 |
| 7.6 | 0.104 | Anthraquinone | ---do--- | 1 |
| 15.2 | 0.218 | 1,5-dinitronaphthalene. | Incandescent bulb of 100 watts. | 10 |
| 15.2 | 0.26 | 1,2-benzanthraquinone. | ---do--- | 5 |
| 7.6 | 0.335 | Hexabromonaphthalic acid anhydride. | ---do--- | 1 |
| 15.2 | 0.38 | Trinitrofluorenone | 15 watt incandescent bulb. | 20 |
| 7.6 | 0.005 | Rhodamine B extra. | High pressure mercury lamp of 125 watts. | 12 |
| 7.6 | 0.01 | Brilliant Green extra. | ---do--- | 10 |
| 7.6 | 0.01 | Methyl violet | ---do--- | 10 |
| 7.6 | 0.272 | Napthalene-1,4-dicarboxylic acid diethylester. | ---do--- | 8 |
| ------ | 0.010 | Rhodamine B extra. | ------ | ---- |

B. ACENAPHTHYLENE/STRYRENE COPOLYMER (1:1)

| 10 | 0.1 | Chloranil | 100 watt incandescent bulb. | 40 |

C. POLYINDENE

| 7.74 | 0.42 | 2, 4, 7-trinitrofluorenone. | 125 watt high pressure mercury lamp. | 20 |
| 7.74 | 0.49 | Chloranil | ---do--- | 40 |
| 7.74 | 0.085 | Tetracyanoethylene | ---do--- | 30 |
| 7.74 | 0.256 | ---do--- | ---do--- | 5 |
| 7.74 | 0.573 | Tetrachlorophthalic acid anhydride. | ---do--- | 120 |

For the production of polymeric acenaphthylene, a thermal polymerization is advantageously used. For this purpose, a commercial acetnaphthylene purified by recrystallization is heated for one hour to a temperature above its melting point, viz. to about 120–130° C., whereby the viscosity of the melt increases, due to polymerization. Subsequently, the heating bath temperature is decreased to 110° C. After being heated for another 4–5 hours, the polymerization product has solidified to a hard brittle substance. After cooling, it is dissolved in methylene chloride and for reprecipitation the substance is slowly added, drop by drop, to five to ten times its own quantity of methanol; while stirring. The product thus obtained is separated and washed with methanol.

*Example II*

Ten parts by weight of a copolymerizate of acenaphthylene with styrene (molar ratio 1:1) and 0.1 part by weight of chloranil are dissolved in 100 parts by volume of toluene. The solution thus obtained is applied to paper, dried and further treated as described in Example I. When exposed for about 40 seconds, and using a 100 watt incandescent lamp, good images are obtained (see table).

For the preparation of the copolymerizate of acenaphthylene with styrene, there are mixed 29.6 parts by weight of acenaphthylene and 20.4 parts by weight of styrene with 0.05 part by weight of benzoylperoxide. The reaction mixture is heated to a temperature of 100 to 120°

C. within a bomb-tube for four days. After cooling, the polymerization product thus obtained is dissolved in toluene and reprecipitated by the addition of methanol.

*Example III*

The process is carried out as described in Example I, however there is used polyindene instead of polyacenaphthylene. The quantities and additions can be seen from the table.

The polyindene is prepared by dissolving freshly distilled indene in an excess of benzene and at a temperature of 0° C., mixing the solution with about 0.1 to 0.5 percent of boron fluoride etherate. Subsequently, the temperature of the reaction mixture is cautiously increased until polymerization occurs, which can be determined by the vigorous evolution of heat. When the heat is no longer released, the reaction mixture is heated for half an hour under reflux and the polymerizate is precipitated by the addition of petroleum ether. It can be purified by reprecipitation from benzene-petroleum ether.

It will be obvious to those skilled in the art that many modifications may be made within the scope of the present invention without departing from the spirit thereof, and the invention includes all such modifications.

What is claimed is:

1. An electrophotographic reproduction material comprising a conductive support layer and a photoconductive isulating layer, the latter comprising a member of the group consisting of a dyestuff sensitizer and an activator for the photoconductor, and as substantially the sole photoconductor a compound selected from the group consisting of a substantially linear polymerized aromatic compound which compound has at least one non-aromatic double bond in a fused ring through which the compound is polymerized, and such a compound substituted by electron-releasing substituents.

2. A material according to claim 1 in which the aromatic compound is copolymerized with a compound selected from the group consisting of another aromatic vinyl compound and a heterocyclic compound having a polymerizable double bond.

3. A material according to claim 1 in which the aromatic compound is copolymerized with a substituted aromatic vinyl compound.

4. A material according to claim 1 in which the polymerized aromatic compound is polyacenaphthylene.

5. A material according to claim 2 in which acenaphthylene is copolymerized with styrene.

6. A material according to claim 1 in which the polymerized aromatic compound is polyindene.

7. An electrophotographic reproduction process which comprises exposing a charged photoconductive insulating layer on a conductive support layer to light under a master and developing the resulting image with an electroscopic material, the photoconductive insulating layer comprising as substantially the sole photoconductor a compound selected from the group consisting of a substantially linear polymerized aromatic compound, which compound has at least one non-aromatic double bond in a fused ring through which the compound is polymerized, and such a compound substituted by electron-realeasing substituents.

8. A process according to claim 7 in which the aromatic compound is copolymerized with a compound selected from the group consisting of another aromatic vinyl compound and a heterocyclic compound having a polymerizable double bond.

9. A process according to claim 7 in which the aromatic compound is copolymerized with a substituted aromatic vinyl compound.

10. A process according to claim 7 in which the photoconductive insulating layer contains a member of the group consisting of a dyestuff sensitizer and an activator.

11. A process according to claim 8 in which the photoconductive insulating layer contains a member of the group consisting of a dyestuff sensitizer and an activator.

12. A process according to claim 9 in which the photoconductive insulating layer contains a member of the group consisting of a dyestuff sensitizer and an activator.

13. A process according to claim 7 in which the polymerized aromatic compound is polyacenaphthylene.

14. A process according to claim 8 in which acenaphthylene is copolymerized with styrene.

15. A process according to claim 7 in which the polymerized aromatic compound is polyindene.

References Cited in the file of this patent

UNITED STATES PATENTS

| | | |
|---|---|---|
| 1,587,274 | Beebe et al. | June 1, 1926 |
| 2,663,636 | Middleton | Dec. 22, 1953 |
| 2,697,028 | Baker et al. | Dec. 14, 1954 |
| 2,956,878 | Michiels et al. | Oct. 18, 1960 |
| 3,037,861 | Hoegl et al. | June 5, 1962 |
| 3,041,165 | Sus et al. | June 26, 1962 |
| 3,081,165 | Ebert | Mar. 12, 1963 |

FOREIGN PATENTS

| | | |
|---|---|---|
| 463,304 | Canada | Feb. 21, 1950 |
| 669,452 | Great Britain | Apr. 2, 1952 |
| 1,188,265 | France | Mar. 9, 1959 |
| 1,188,590 | France | Mar. 16, 1959 |
| 1,191,326 | France | Apr. 13, 1959 |
| 693,112 | Great Britain | Dec. 22, 1953 |
| 131,467 | Australia | Feb. 22, 1949 |